United States Patent
Chary

(10) Patent No.: US 6,560,713 B1
(45) Date of Patent: May 6, 2003

(54) COMPUTER POWER MANAGEMENT SYSTEM USING AUXILIARY POWER SUPPLY DURING SLEEP STATE TO PROVIDE POWER TO ALL DEVICES IF SUFFICIENT AND REDUCING LOAD IF NOT SUFFICIENT

(75) Inventor: Ram V. Chary, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/224,037

(22) Filed: Dec. 31, 1998

(51) Int. Cl.$^7$ ................................................. G06F 1/26
(52) U.S. Cl. ...................... 713/340; 713/320; 713/323; 713/324
(58) Field of Search ................................. 713/300, 323, 713/324, 320, 340; 323/318

(56) References Cited

U.S. PATENT DOCUMENTS

| | | | | |
|---|---|---|---|---|
| 5,517,649 A | * | 5/1996 | McLean | 713/323 |
| 5,710,929 A | * | 1/1998 | Fung | 713/322 |
| 5,752,046 A | * | 5/1998 | Oprescu et al. | 713/300 |
| 6,124,692 A | * | 9/2000 | Canada et al. | 318/490 |

* cited by examiner

Primary Examiner—Thomas Lee
Assistant Examiner—Thuan Su
(74) Attorney, Agent, or Firm—Fish & Richardson P.C.

(57) ABSTRACT

An instant-on PC is described which can be revived from a sleep state in a matter of seconds. This is carried out by keeping certain power-managed devices in a quickly-revivable state, e.g., the memory and certain elements on the motherboard chipset. Certain PCI devices are also enabled in a quick wake-up state so that they can wake up on a specified stimulus. The power consumption of each of these devices is obtained and it is determined if that power consumption exceeds the power capability of the auxiliary power supply. If not, the more aggressive sleep state is enabled. If so, however, the system takes action to either enter a less aggressive sleep state or to selectively de-enable certain ones of the devices that are in the keep-awake state. Preferably the choice of which to do is made by the user.

11 Claims, 2 Drawing Sheets

COMPUTER POWER MANAGEMENT SYSTEM USING AUXILIARY POWER SUPPLY DURING SLEEP STATE TO PROVIDE POWER TO ALL DEVICES IF SUFFICIENT AND REDUCING LOAD IF NOT SUFFICIENT

BACKGROUND

Recent specifications have described how a personal computer ("PC") should allow suspension to a power-managed sleeping state. It is desirable that the computer become available for use quicken when removed from that sleeping state. Modern specifications prefer that the PC become available within do approximately 10 seconds.

The Windows 98 current release includes support for certain kinds of power management. One is the so-called Advanced Configuration and Power Management Interface ("ACPI") jointly promulgated by Intel/Microsoft/Toshiba, and the "On-Now" specification published by Microsoft. These specifications describe hardware and software that facilitates placing the system into a power-managed sleep state. In the ideal case, the user would command the machine to power off, but the PC would continue to power certain components to allow a rapid restart.

Different sleep states are described in the applicable specifications. The sleep states are often called S1, S2, S3, S4, and S5. Each sleep state represents a different trade-off between power consumption and the time it takes to wake. The S3 sleep state, in which the information is suspended to RAM but certain wake-up parameters are monitored, is especially advantageous. Over 95% of the PC's power is shut off, thereby enabling phenomenal power savings. The information is stored in DRAM, allowing the resume time to be less than 5–10 seconds. This also enables off yet communicating" capabilities in which an external stimulus, such as an incoming telephone call, will wake the system to appropriately answer the incoming call.

The S3 mode requires an auxiliary power source which powers certain system components which are called the "keep-alive" logic while the system is sleeping. It is desirable that the auxiliary power supply have a capacity of 2–3 watts. This amount of power can be easily dissipated without any fans. The operation also requires a split-power plane design so that the auxiliary power source can power only those required portions. The majority of the PC, including the processor and most peripherals, remain unpowered. This allows the system to effectively resume immediately rather than booting the system each time.

In addition, the PC can wake on various external stimuli. For example, the system must be able to wake when the user wants to reuse the PC. Other system stimuli, such as incoming networkbased triggers ("Wake-on-Lan") should also be able to revive the sleeping PC.

This system, of course, will only work if these features work reliably. This means that the PCS must be able to successfully transition between the sleeping and waking states.

SUMMARY

According to the present system, the operation uses a list of power managed devices, and rules for those devices. The list of devices is maintained by the operating system. The devices that are used is based on the actual hardware that is installed, as well as the system state. This list is used to determine how much power will be necessary in different system modes.

If the necessary power is beyond the power capabilities of the auxiliary power supply, then the operating system takes preventative action. A preferred prevention includes using a less aggressive sleep mode—that is, one that consumes more main power or takes longer to wake. Another preferred prevention includes terminating power management to some of the auxiliary devices, e.g., some of the PCI cards.

BRIEF DESCRIPTION OF THE DRAWINGS

These and other aspects will be described in reference to the accompany drawings wherein.

DESCRIPTION OF THE PREFERRED EMBODIMENTS

Figure 1:
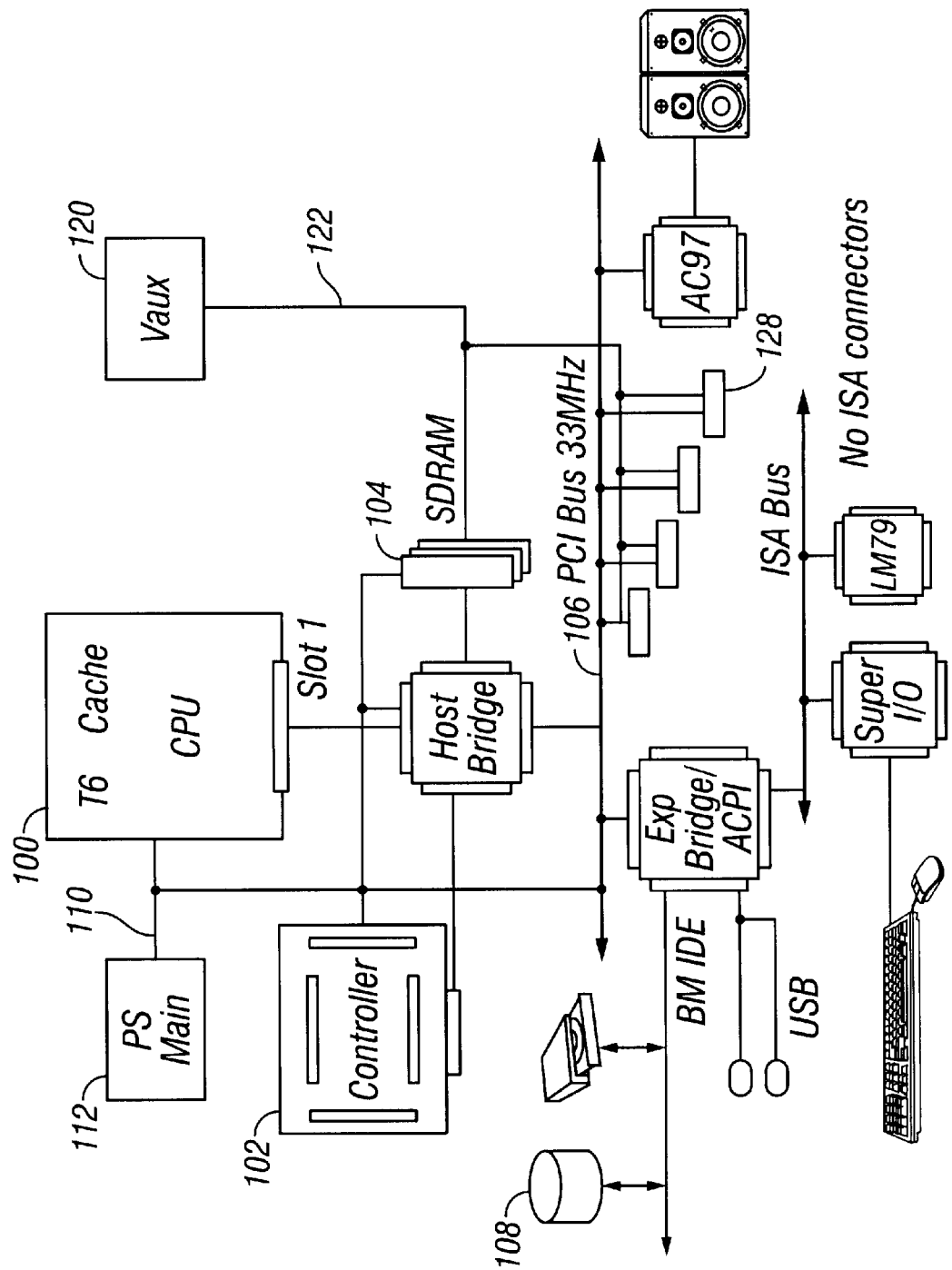
FIG. 1 shows a basic block diagram of the power-managed system.

A preferred embodiment of the instantly-available PC is shown in block diagram in FIG. 1. The PC system includes the components of a computer, including a processor running an operating system, controller 102, memory 104, external devices 108, a PCI bus 106, and other unenumerated structures. A first power bus 110 connects the main power supply 112 to all of the components. A second power supply, V-aux 120 (which can be part of the main power supply 112), is also connected to certain selected power-management devices through a totally separate power bus 122. The power bus 122 extends at least to the memory 104, and to certain peripherals on the PCI bus. Although the V-aux is shown as a separate power supply, it can alternatively be the same power supply as the main supply.

In the most-aggressive sleep state, the S3 state, power is removed from the main bus. V-aux power supply 120 provides power to the power-managed portions, including certain PCI cards. PCI cards, such as 128, have a special input pin to maintain the PCI card in the power-managed state. This enables the PCI card for listening and responding to wake-up events. The specific cards are only so enabled, however, if the Operating System determines that the applications which are running require the specific card.

For example, a PCI modem could be maintained in the power-managed state if a modem program, e.g., Winfax, is running. If Winfax is terminated, then the modem does not need to wake on ring, and the power to the modem can be terminated.

The V-aux power supply is intended to be a small power supply in order to conserve on energy, minimize fan noise, and the like. V-aux can have a power consumption of 2–3 watts. If too much load is put on the V-aux power supply, its output voltage could drop. Each additional PCI card can require up to 375 ma in the sleep state.

The inventor recognized that too much that this could have one of a number of different results: the system could become unreliable, one or more of the PCI cards may be unable to wake up the system, data in the memory could be lost, or the V-aux power supply could be damaged. Any of these alternatives are, of course, unacceptable.

The present inventor recognized that the operating system, e.g., Windows 98, in any case keeps track of power management needs of the system. The present embodiment uses the information that is gathered by the Operating System to detect power needs during sleep and wake up. This detection can be detected by either the operating system, by dedicated hardware structure, or a combination of both. The system operates to determine whether the demand on the V-aux exceeds the supply, and, if so, takes preventative action.

Preventative action can include not enabling one or more of the power-managed cards for wake-up and/or placing the system into a less aggressive sleep state allowing the primary power supply to continue to power all devices.

The power management operation proceeds according to information and rules. The information includes static rules that are stored in an INF file by the operating system. It also includes dynamic enumeration that is carried out as appropriate.

The static rules stored in the INF file include a number of classes of information. This includes:

The power supply delivery capability for the main and V-aux power supplies.

The number of USB ports and their associated power consumption requirements.

The power consumption requirements of the motherboard devices, including the chipsets and LEDs which remain lit.

A number of rules are also used in evaluating the INF file and the other information. This includes:

The ATX revision. The ATX revision tells the system what modes are supported and the various power consumption requirements for the different modes. For example, ATX revision 2.1 implies a 720 ma power state in S3. However, ATX 1 would imply that S3 could not be supported at all.

Is wake-up of the USB devices from S3 supported by the platform. Typically, the USB requires 500 ma per port at 5 V dual.

The dynamic discovery requires enumerating the devices on the PCI bus. This could be carried out by scanning all the devices on the PCI bus, or by PCI BIOS calls. For each PCI device, the system reads the power management registers to identify if the system can support waking up from a cold state. The power management registers are described in the PCI power management specification. Power management registers also enumerate maximum current requirements for the specific device.

The USB devices are similarly polled. A scan is made to discover active devices on each port and identify if those active devices can be waked from an S3 state.

Figure 2:
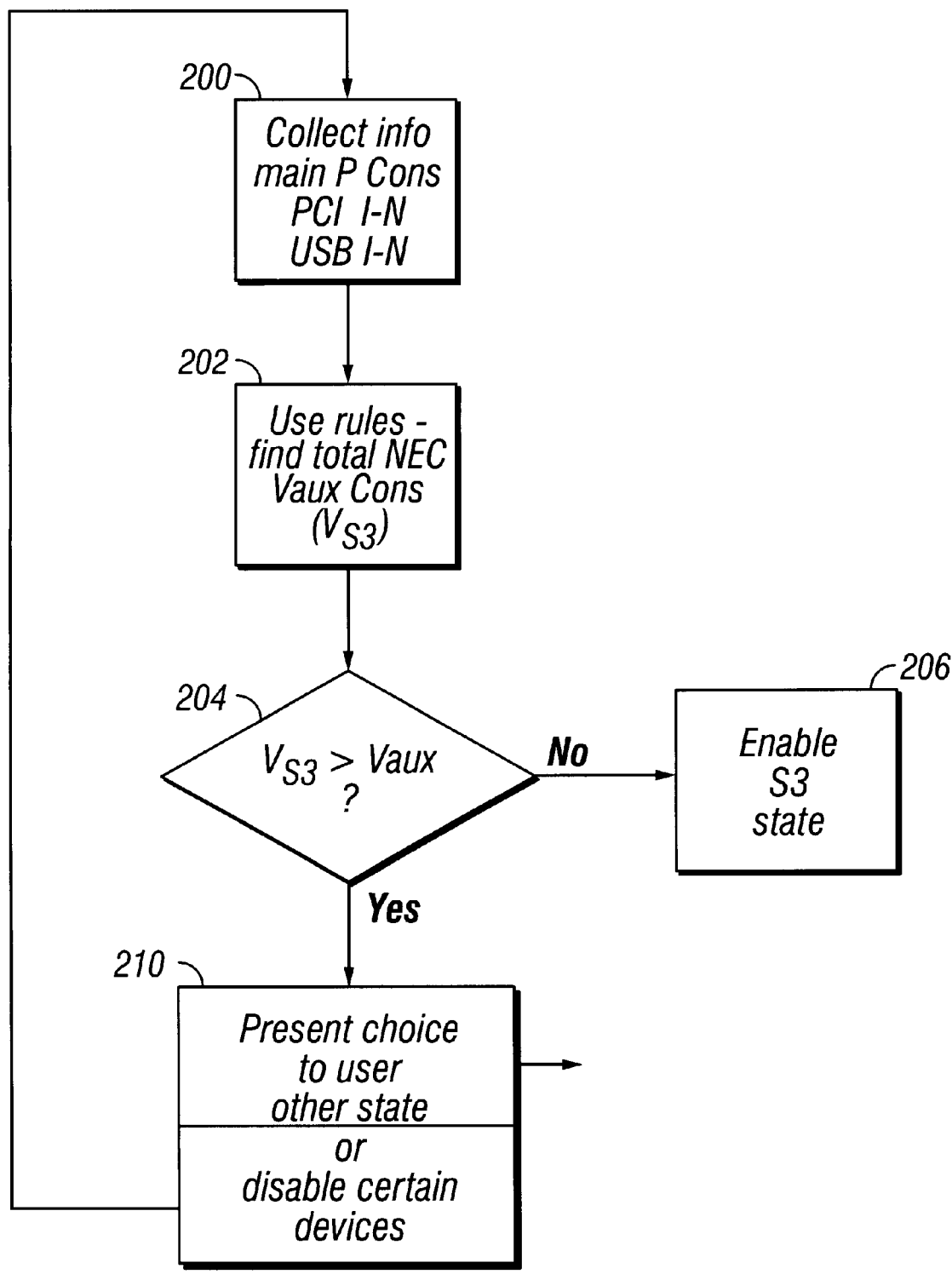
FIG. 2 shows a flowchart of operation of the preferred embodiment.

The operation proceeds according to the flowchart of FIG. 2. At step 200, the system collects information, e.g., from the INF file and/or from other parts of the operating system, about the parameters enumerated in Table I. This includes the main power consumption, which is the power consumption of the motherboard components that need to be kept awake, LEDs that need to remain shining, and other information about the main system power supply. Step 200 also collects information on the power-managed PCI devices 1–N. This includes only those PCI devices which need power management, e.g., those which are required to wake on stimulus or require quick awakening. Step 200 also collects information on the USB ports by looking at each USB port and determining if a power-managed device is present thereon.

At step 202, the system uses the rules in Table I along with the collected information at step 200 to find the total necessary auxiliary power consumption for the current system configuration. This value $V_{s3}$ is compared with the capacity of the power supply at step 204. The capacity of the power supply at step 204 is also one of the static information features found in Table I. If $V_{S-3}$ is larger than V-aux, then S3 is enabled at step 206, indicating that no problems are likely to occur with S3 operation. If not, the system enters a conflict resolution operation at step 210. The system can automatically select an alternative. More preferably, the operation in step 210 presents the choices to the user. These choices include (1) enter another power-managed state, or (2) disable certain devices to avoid power overload. A list of devices is displayed to the user, preferably with check boxes enabling the user to select those alternative devices for removal from the power-managed state. Each time one of these devices is selected, the flow returns to step 200 where the entire configuration is re-calculated to determine if the new $V_{S3}$ is greater than the power supply capacity.

This allows the system to refuse to enter a sleep state that the auxiliary power supply cannot support.

Although only a few embodiments have been described in detail above, those of ordinary skill in the art certainly understand that modifications are possible. All such modifications are intended to be encompassed within the following claims, in which:

What is claimed is:

1. A method of managing power in a power-managed personal computer system, comprising:

operating the computer system using an operating system which keeps track of power-managed aspects of the computer system;

obtaining information about the computer hardware information stored in the power-managed portion;

determining a total power consumption of all monitored devices during power-managed states;

determining if an auxiliary power supply which will be used as the exclusive power supply during said power-managed state but not as the exclusive power supply during non power managed states, is sufficient to power all said monitored devices;

operating the system in a first specified power-managed state if said auxiliary power supply is able to power all said monitored devices in said power managed state; and taking action to avoid power supply overload if said auxiliary power supply is not able to power all said monitored devices in said power managed state.

2. A method as in claim 1 wherein said taking action comprises entering a less aggressive sleep state than said first specified power managed state, which requires more time to awake.

3. A method as in claim 1 wherein said taking action comprises removing some devices from being powered during the power-managed state.

4. A method as in claim 1 wherein said taking action comprises allowing a user to select devices to be removed from being powered during the power-managed state.

5. A method as in claim 1 wherein said first specified power-managed state is an S3-type sleep state.

6. A method as in claim 1 wherein said obtaining power information comprises scanning a PCI bus to determine PCI cards which can be power managed and determining power requirements for said PCI cards which can be power managed.

7. A method as in claim 6 further comprising scanning universal serial bus (USB) information to determine any wakable devices on the USB port.

8. A computer program product, comprising:

a computer-usable medium which stores machine-readable instructions, the instructions for causing a computer system to:

scan power-managed devices in the system;
determine which of the power-managed devices are active;
determine a total power consumption of the power-managed devices;
compare said total power consumption with a power delivery capability of a sleep-managed power supply which will be used as the exclusive power supply during power-managed state but not as the exclusive power supply during non power managed state;
allow said computer to enter a first specified sleep state if said sleep-managed power supply is adequate; and
take an action to reduce a load on the power supply if said sleep-managed power supply capacity is not sufficient.

9. A product as in claim 8, wherein said take an action comprises entering a less aggressive sleep state than said first specified state, said less aggressive sleep state being one which requires more time to awake.

10. A product as in claim 8, wherein said take action comprises removing some of said power managed devices from said power-managed state.

11. A product as in claim 8, wherein said take action comprises allowing a user to select some of said power managed devices to be unpowered during the power-managed state.

* * * * *